Sept. 24, 1957 L. R. WOODS 2,807,659
TUBE CLAMP AND SHIELD
Filed March 30, 1953 2 Sheets-Sheet 1
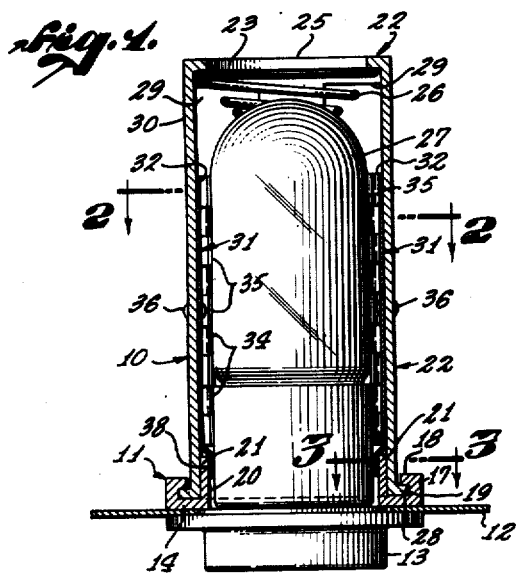
LEROY RALPH WOODS,
INVENTOR.
HUEBNER, BEEHLER,
WORREL & HERZIG,
ATTORNEYS.

Sept. 24, 1957  L. R. WOODS  2,807,659
TUBE CLAMP AND SHIELD
Filed March 30, 1953  2 Sheets-Sheet 2
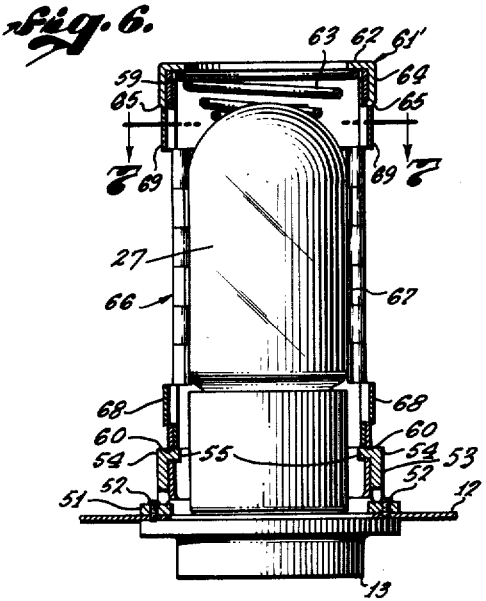
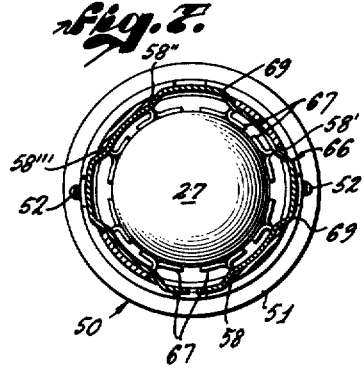
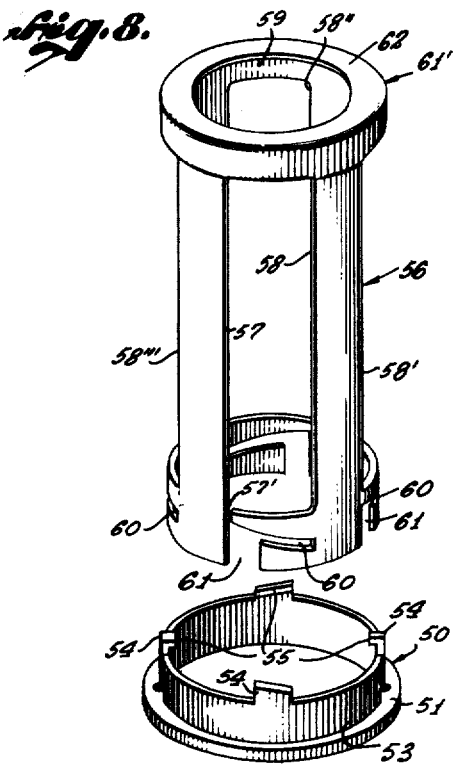
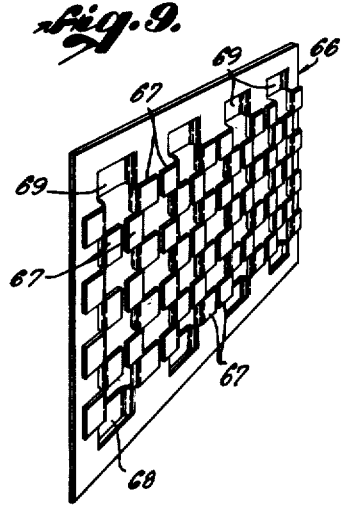
LEROY RALPH WOODS,
*INVENTOR.*
HUEBNER, BEEHLER,
WORREL & HERZIG,
*ATTORNEYS.*

United States Patent Office 2,807,659
Patented Sept. 24, 1957

1

2,807,659

TUBE CLAMP AND SHIELD

Leroy Ralph Woods, Whittier, Calif., assignor, by mesne assignments, to International Electronic Research Corporation, Burbank, Calif., a corporation of California Application March 30, 1953, Serial No. 345,597

19 Claims. (Cl. 174—35)

The invention relates to the field of electronic accessories and has particular reference to a device for use with conventional vacuum and electronic tubes for the purpose of holding the tubes in place under circumstances where there might be considerable vibration, insufficient air circulation causing overheating, or perhaps where there may be present other electric vibrations or impulses from which the tube should be shielded.

Tube clamps have been in common use for securing and protecting vacuum tubes for a great many years, in fact, almost as long as vacuum tubes have been in use. The tube clamps heretofore used, however, have been little more than relatively thin sheet metal cylinders fitting over the tubes in a somewhat careless or indifferent fashion. Various means have been employed for holding the tubes in place but such holding devices as have been employed have been those which could not be relied upon under all circumstances for properly retaining the tube. Under other circumstances where the heating of the tube or cooling of the tube has been a problem, tube shields in the form of tube clamps where they have been employed have been little more than stacks for the casual circulation of air. Where the tubes have needed cooling, the tube shields have never been so constructed as to provide an effective reradiating surface.

More particularly since the employment of immense numbers of tubes on guided missiles and jet planes, tubes have been subjected to vibrations far exceeding anything heretofore experienced and also vibrations of a character not heretofore of great importance. Under those circumstances the tube shields which have been established as conventional tube shielding and clamping devices have been found to be ineffective in that they permit the elements in the tube to deteriorate very rapidly under the vibrational strains and in some instances even to contribute to the breakdown of the elements in the tubes under vibration. On some occasions where the tubes have been insufficiently and unsatisfactorily supported, the vibrational strain between the tube clamp contacts and the glass of the tube has been such as to shatter the glass itself.

It is therefore among the objects of the invention to provide a new and improved tube clamp and shield which is very highly shock resistant to the point where the life of conventional vacuum tubes has been lengthened by many hundreds of hours under extremely adverse circumstances.

Another object of the invention is to provide a new and improved tube clamp and shield which isolates the tube with an extremely high degree of effectiveness by providing a great many separate and individual resilient contacts between the tube clamp and the glass of the tube on all sides and throughout its length so that vibrational shocks are evenly distributed and dampened to the extent that they become almost ineffective to cause deterioration of the tube.

2

Another object of the invention is to provide a new and improved combination tube clamp and shield which in addition to providing an effective isolation against vibrational shock waves is also an effective heat dispersing medium which greatly assists in the dissipation of heat from the tube under circumstances where overheating might be the cause of poor performance, the combined tube clamp and shield being further so constructed that heat is dissipated not only by being reradiated from the shield but also by being very efficiently conducted through the shield and its support to the chassis of the installation.

Still another object of the invention is to provide a new and improved tube clamp and shield which very effectively minimizes microphonics within the tube itself.

Another object of the invention is to produce a tube clamp and shield which has a very appreciable shielding effect to protect the tube from stray radiations without the necessity of employing a completely enveloping metallic envelope.

Also included among the objects of the invention is to provide a new and improved tube clamp and shield which is extremely inexpensive in view of its high degree of utility, which is substantially universal in its design in that it can be applied to a great variety of different types of tubes, and which further is so constructed that it can be readily installed upon standard chassis and electronic installations.

With these and other objects in view, the invention consists in the construction, arrangement and combination of the various parts of the device whereby the objects contemplated are attained, as hereinafter set forth, pointed out in the appended claims and illustrated in the accompanying drawings.

In the drawings:

Figure 1 is an elevational sectional view showing the tube clamp and shield in place over an electronic tube.

Figure 2 is a cross-section taken on the line 2—2 of Figure 1.

Figure 3 is a fragmentary cross-sectional view taken on the line 3—3 of Figure 1.

Figure 4 is an exploded view in perspective showing parts of the tube clamp and shield in the form they would have prior to assembly.

Figure 5 is a perspective view of one of the spring members utilizable in the cylindrical portion of the clamp.

Figure 6 is an elevational sectional view showing another form of the device in place over an electronic tube.

Figure 7 is a cross-sectional view taken on the line 7—7 of Figure 6.

Figure 8 is an exploded perspective view of the holder and envelope of Figure 6.

Figure 9 is a perspective view of the spring member of Figure 6 before being rolled and inserted within the envelope.

In an embodiment chosen to illustrate the invention there is shown a tube clamp and shield indicated generally by the reference character 10 mounted upon a holder 11 which in turn is mounted upon a support 12 which may be a part of the chassis of some appropriate electronic unit. A socket 13 of any one of the several conventional types is mounted beneath the support 12 in a somewhat loose fashion as is customary in the trade.

The holder 11, shown in perspective view in Figure 4, consists of a disc-like annular ring 14 provided with lugs 15 having holes 16 therein by means of which the holder can be secured to the support 12 by means of conventional screws. The annular ring portion has a series of outwardly extending retainers 17, four in number, having overhanging lips 18 providing slots 19. At the inner edge of the annular ring is an upstanding flange 20 from which a series of four friction guides 21 extend upwardly, as viewed in Figure 4.

The main portion of the tube clamp and shield consists of a metal envelope 22 which may, for example, be of thin sheet aluminum, the envelope as herein illustrated being uniformly cylindrical and having an open top 23 and an open bottom 24. The top for convenience may be provided with an overhanging flange 25 adapted to retain beneath it a spring 26 of progressively diminishing diameter, as illustrated in Figure 1, so that the outermost turn of the spring can be secured beneath the flange and the innermost turn, of smallest diameter, be adapted to press resiliently against the top of a vacuum tube 27.

At the base of the envelope is a series of four outwardly extending feet 28, these feet being of a proper thickness and length so as to slide snugly within the slots 19.

It will be noted that the envelope 22 is provided with a series of four substantially rectangular openings 29 spaced evenly around the circumference of the envelope. Between the openings 29 are imperforate portions 30 of substantially equal width and length. The openings 29 extend throughout a distance almost the height of the envelope and are slightly greater in width than the width of the intervening imperforate portions 30.

Spring members 31, illustrated in Figure 5, are four in number and provide the direct support for the tube 27 within the tube clamp. Each spring member is identical and consists of a central column or rib 32, the relative length of which can be readily determined from an inspection of Figure 1. The column is ordinarily made from a piece of sheet stock preferably spring copper which can be formed by a suitable set of dies into the shape illustrated in Figure 5. As there shown on each longitudinal edge 33 is a series of laterally extending leaf spring elements 34 which extend in a generally circumferentially arcuate direction, as clearly shown in Figures 2 and 3.

Alternating with the leaf spring elements 34 is a series of reversely bent inwardly directed leaf spring elements 35 which alternate with the leaf spring elements 34 on both of the longitudinal edges 33 of the central column or rib 32. The spring elements 35 also take a circumferentially arcuate direction, as clearly illustrated in Fig. 2, so that both the elements 34 and 35 conform to the arcuate exterior of the glass of the tube 27. The spring members 31 may be secured each to its respective imperforate portion 30 by means of rivets 36, for example, as illustrated in Figure 1. Rivet holes 37 are provided in the central column 32.

One spring member being thus secured at each one of the imperforate portions 30 provides a spring member on each of four sides of the tube 27 having a position enabling the spring members to distribute resilient pressure evenly on all sides of the tube.

For additional safety and security there is provided at the bottom of each spring element 31 a resilient pocket, which pocket is constructed of an inwardly dished portion 38, illustrated in Figures 3 and 5. The resilient pocket is adapted to frictionally receive the respective friction guide 21 already described as being a part of the flange 20 of the holder 11.

In the construction of the tube clamp and shield it has been found advantageous to employ a black cadmium finish on the spring members. The envelope 22 can more advantageously be constructed with a black crackle finish, both finishes being such as to greatly enhance the dissipation of heat by radiation. Inner faces of the spring elements 34 and 35 should carefully conform to the shape of the glass of the tube and be cleaned sufficiently to provide a good contact. It is also very greatly advantageous to provide an effective electric and heat conducting contact between the feet 28 and the retainers 17. The good contact is further enhanced by a close metal to metal fit of the friction guides 21, each in its respective resilient pocket.

In use of the tube clamp it is customary first to mount the holder 11 upon the support 12 by means of suitable screws 39, as illustrated in Figure 2. With the holder in place the tube 27 is then installed and after its installation the tube clamp is placed over the tube. The feet 28 initially fall into spaces between the retainers 17 with a lowermost ring portion 40 at the base of the envelope fitting with a snug friction fit around the exterior of the flange 20 and within the innermost faces of the lips 18. The clamp is then rotated until the feet 28 slide with a snug friction fit into the respective slots 19. In this position the spring 26, if a spring be used, will press against the top of the tube 27 and positively prevent its dislodgement. At the same time virtually each and every one of the spring elements 34 and 35 press each in its turn against the respective section of the exterior surface of the tube 27 either on the glass portion or at its base. The tension of the spring elements can be adjusted so that it will be proper for any one of a great many different circumstances where different vibrational shock waves may be encountered. The tension may be relatively light at each resilient contact but by reason of the fact that there are a multiplicity of contacts distributed in a uniform well-defined pattern over the length and circumference of the tube, the total frictional support for the tube will be appreciable and sufficient to hold the tube in place even in the absence of the spring 26. Moreover, by uniformly supporting the tube in this manner by a multiplicity of resilient spring elements distributed as described, vibrational shocks will be almost completely absorbed in the spring elements and not conveyed to the tube. It may be said that the tube floats within the clamp isolated against vibration.

Further, by reason of the fact that the spring elements 34 extend into the openings 29, there is a grid-like pattern effect entirely surrounding the tube with such spacing between the metallic elements that the clamp forms an effective shield against stray radiation. Still further, by reason of the fact that the combination of spring elements 35 lie in open spaces, such as the openings 29, free circulation of air is assured in and around the tube and the ambient temperature can be controlled very effectively using suitable conventional air circulators. At the same time the spring elements provide an open construction permissive of free circulation of air and moreover supply a multitude of heat-conducting contacts from the glass to the holder and the support. A substantial quantity of the heat from the tube will thereby be dissipated by conduction. Heat conducted to the spring elements and the envelope can to a considerable degree be also dissipated by reradiation from the roughened and darkened finish surfaces. It has been found advantageous to employ an envelope black on both sides, the surface of which may be roughened either by sand-blasting or a wrinkle finish. The outside of the spring elements may be similarly finished.

In another form of the device illustrated in Figures 6 through 9, inclusive, the device is shown in a more simplified construction wherein the envelope and spring member are built from sheet metal rolled to cylindrical form and contained one within another and within a suitable holder at the bottom.

More particularly, there is provided a holder 50 annular in shape and provided with a base flange 51 adapted to be mounted upon the supporting surface 12 immediately above the socket 13 as has been previously described in connection with the holder 11. Screws 52 are suggested for attaching the holder to the supporting surface. The holder includes an upstanding ring portion 53 at the top of which are ears 54 which have inwardly turned portions 55 all sloping in the same general direction.

An envelope 56 is constructed of sheet metal rolled into the cylindrical form, illustrated in Figures 6 and 8, such that one longitudinal edge 57 takes a position in abutment with the other longitudinal edge 57'. The envelope is provided with large cut-out areas 58, 58', 58" and 58'''.

The upper end of the envelope shows a continuous annular portion 59 except for the split between the edges 57 and 57'. The envelope is ordinarily rolled to a dimension so that the outer diameter is slightly greater than the inner diameter of the ring portion 53 so that it may be contracted when mounted on the holder and thereafter permitted to spring outwardly into snug engagement with the holder.

For connecting the envelope 56 to the holder 50 there are provided obliquely disposed slots 60 at the base of the envelope, these having a width adapted to receive the inwardly turned portions 55 of the ears 54. By providing longitudinal openings 61 the inwardly turned portions 55 are admitted to the location of the slots 60 and the envelope can thereafter be rotated so as to force the inwardly turned portions 55 into the lowermost ends of the slots.

To maintain the envelope in its cylindrical form there is provided at the upper end an annular continuous flanged retainer 61'. This is preferably constructed with an inwardly directed flange 62 overlying the top and serving as a keeper for a conical coiled spring 63.

A vertical side wall 64 of the retainer extends downwardly overlying the exterior of the envelope but more particularly extending down to a location slightly lower than the annular portion 59 so that the side wall 64 may be crimped at points 65 so as to underlie the annular portion 59 at the tops of the cut-out areas 58, 58', etc.

A spring member 66 is shown in Figures 6 and 7 located within the envelope 56. The spring member is shown in sheet form in Figure 9. As suggested the spring member is constructed from sheet metal having suitable resilient characteristics to support a multiplicity of curved spring elements 67 on one face thereof, this being the inner face when the spring member is rolled into the cylindrical form illustrated in Figures 6 and 7.

The spring member may have the spring elements cut out of the material of the member and turned into somewhat curved shapes inwardly forming some selected predetermined pattern of spring elements over substantially the entire surface of the spring member which will encompass the electronic tube. While the particular pattern is not critical, it is, however, important that there be a somewhat uniform distribution of spring points so that the resilient pressure on the tube will be distributed to those portions of the tube which need support in order that there be balanced support on all sides arranged so as to most effectively dampen vibrations which might exist.

The spring member 66, being inherently resilient in character, is preferably rolled and then inserted within the envelope 56. Outwardly pressed lugs 68 at the bottom readily protrude outwardly into the adjacent cut-out areas 58 and similar lugs 69 at the top also protrude outwardly into the respective cut-out areas. By spacing the lugs 68 and 69 at proper distances longitudinally, they serve to engage the underside of the annular portion 59 at the top and the upper side of a corresponding portion at the bottom so that once in place the spring member will not shift endwise. As previously noted, the inherent resiliency will expand the spring member outwardly into snug engagement with the inside wall of the envelope.

The coiled spring 63 may be relied upon to additionally secure the electronic tube in place and to assist in properly holding the tube clamp in its surrounding position.

There has thus been described a tube clamp and shield of extremely simple character but which by reason of its construction is highly effective as a shock minimizer, heat radiator, and shield. The construction, moreover, is one of extremely simple character capable of being formed by relatively inexpensive dies and machinery to the end that tube clamps of the sort herein described can be provided in ample quantities to fit practically any installation.

While I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent devices.

Having described my invention herein, what I claim as new and desire to secure by Letters Patent is:

1. A tube clamp and shield for electronic tubes comprising an encircling metal envelope, means at the base of the envelope for attaching the envelope to a holder, and means for holding the tube within the envelope comprising a multiplicity of spring contact elements of heat conducting metal on the inner face of the envelope arranged in a uniform pattern throughout the inner circumference and length of the envelope, said contact elements being spaced one from another in a circumferential direction and being spaced one from another in a direction transverse to the circumferential direction and being adapted to resiliently engage the exterior of the tube.

2. A tube clamp and shield for electronic tubes comprising a circumferentially continuous metal envelope, means at the base of the envelope for attaching the envelope to a holder, and means for holding the tube within the envelope comprising a multiplicity of spring contact elements of heat conducting metal on the inner face of the envelope spaced one from another in a longitudinal direction forming rows, said rows being arranged at laterally spaced intervals throughout the inner circumference of the envelope and adapted to resiliently engage the exterior of the tube.

3. A tube clamp and shield for electronic tubes comprising a substantially cylindrical metal envelope greater in length than the length of the tube and greater in diameter than the diameter of the tube, a configuration at the base of the envelope comprising means for attaching the envelope to a holder, and means for holding the tube within the envelope comprising a multiplicity of substantially flat surfaced spring contact elements of heat conducting metal on the inner face of the envelope spaced one from another in a longitudinal direction forming rows, said rows being spaced laterally and numbering at least eight rows of alternately spaced elements adapted to resiliently engage the exterior of the tube and extending uniformly throughout the inner circumference of the envelope.

4. A tube clamp and shield for electronic tubes comprising an encircling metal envelope having an open base and clamping means at the base adapted to secure the envelope in a holder, said envelope having a series of elongated circumferentially disposed openings separated by portions of the envelope, and a spring member on said portion having longitudinal edges and comprising a series of longitudinally spaced individual laterally extending spring elements of heat conducting metal on each longitudinal edge, and a second series of individual longitudinally spaced spring elements on each longitudinal edge extending across the said portion of the envelope, all said spring elements being biased toward the interior of the envelope and adapted to press into firm contact with said tube simultaneously on all sides thereof.

5. A tube clamp and shield for electronic tubes comprising a circumferentially continuous metal envelope having an open base and clamping means at the base adapted to secure the envelope in a holder, said envelope having a series of elongated circumferentially disposed openings separated by integral portions of the envelope, and a separate spring member mounted on each integral portion comprising a series of longitudinally spaced individual laterally extending spring elements on each longitudinal edge adapted to be positioned in the respective opening at the near side thereof and a second series of individual spring elements of heat conducting metal on each longitudinal edge extending across said portion of the envelope, said spring elements being biased toward the interior of the envelope and adapted to press into firm contact with said tube simultaneously on all sides thereof.

6. A tube clamp and shield for electronic tubes comprising a substantially cylindrical metal envelope having an open top and base and clamping means at the base adapted to secure the envelope to a holder, said envelope having a series of four elongated circumferentially disposed openings separated by integral portions of the envelope, and a separate spring member mounted on each integral portion comprising a series of individual laterally extending leaf spring elements on each longitudinal edge at uniformly spaced distances apart adapted to be positioned in the respective opening at the near side of said opening and a series of individual reversely inwardly bent leaf spring elements of heat conducting metal on each longitudinal edge alternating with the first identified spring elements, all said spring elements having inside faces thereof curved in conformity with the exterior of the tube and adapted to press into firm contact with said tube simultaneously on all sides thereof.

7. A tube clamp and shield for electronic tubes comprising an annular holder, a substantially cylindrical metal envelope, means on said holder and at one end of the envelope forming a releasable connection therebetween, said envelope having longitudinal openings therethrough, and an outwardly expansible spring member comprising a substantially cylindrical sleeve of sheet metal adapted to be contained in said envelope with an outwardly springing fit and interlocking means respectively on said envelope and said sleeve, said sleeve having a multiplicity of inwardly curved resilient spring portions of heat conducting metal scattered in a predetermined pattern around the interior surface and adapted to engage the tube at a corresponding number of locations.

8. A tube clamp and shield for electronic tubes comprising an annular holder, a metal envelope of sheet metal formed into a cylinder with longitudinal edges adjacent each other, said envelope having an external diameter greater than the internal diameter of the holder and adapted to be compressed and to spring outwardly into contact therewith, means on said holder and at one end of the envelope forming a releasable connection therebetween, said envelope having longitudinal openings therethrough, an expansible spring member comprising a substantially cylindrical sleeve adapted to be restrained by and contained in said envelope and interlocking means respectively on said envelope and said sleeve, said sleeve having a multiplicity of inwardly curved resilient portions of heat conducting metal scattered in a predetermined pattern around the interior surface and adapted to engage the tube at a corresponding number of locations.

9. A tube clamp and shield for electronic tubes comprising an annular holder, a metal envelope of sheet metal formed into a cylinder with longitudinal edges adjacent each other, said envelope having an external diameter greater than the internal diameter of the holder and adapted to be compressed and to spring outwardly into contact therewith, means on said holder and at one end of the envelope forming a releasable connection therebetween, said envelope having longitudinal openings therethrough, an expansible spring member comprising a substantially cylindrical sleeve of sheet metal adapted to be contained in said envelope with an outwardly springing fit at a location spaced from the connection of the envelope with the holder and interlocking means respectively on said envelope and said sleeve, said sleeve having a multiplicity of inwardly curved resilient portions of heat conducting metal scattered in a predetermined pattern around the interior surface and adapted to engage the tube at a corresponding number of locations.

10. A tube clamp and shield for electronic tubes comprising an annular holder, a metal envelope of sheet metal formed into a cylinder with longitudinal edges adjacent each other, said envelope having an external diameter greater than the internal diameter of the holder and adapted to be compressed and to spring outwardly into contact therewith, means on said holder and at one end of the envelope forming a releasable connection therebetween, said envelope having longitudinal openings therethrough, an expansible spring member comprising a substantially cylindrical sleeve of sheet metal adapted to be contained in said envelope with an outwardly springing fit and interlocking means respectively on said envelope and said sleeve, said sleeve having a multiplicity of inwardly curved resilient spring portions of heat conducting metal scattered in a predetermined pattern around the interior surface and adapted to engage the tube at a corresponding number of locations, said sleeve being located at a position spaced outwardly of the connection between the holder and the envelope, and an annular continuous flanged retainer ring secured at the top of the envelope adapted to fix the circumference of the envelope and to provide a coil spring keeper.

11. A tube clamp and heat disperser comprising a substantially cylindrical envelope having heat radiating surfaces and having an open base, a holder adapted for mounting on a support means on the base of the envelope adapted to engage the holder, circumferentially spaced elongated openings in the envelope and spring means on portions of the envelope between the openings and having a multiplicity of substantially uniformly spaced individual spring elements of heat conducting metal forming a pattern of resilient contacts at the interior of the envelope and adapted to engage the tube throughout the length and circumference thereof, a series of circumferentially spaced friction guides extending from the edge of the holder normally adjacent the envelope and resilient means at the base of the envelope forming a resilient connection between the envelope and the holder.

12. A tube clamp and heat disperser comprising a circumferentially continuous envelope having heat radiating surfaces and having an open top and base, a holder adapted for mounting on a support having overlying lips forming slots therebeneath, and feet on the base of the envelope adapted to engage within the slots, circumferentially spaced elongated openings in the envelope and spring means on portions of the envelope between the openings, said spring means comprising a multiplicity of substantially uniformly spaced individual spring elements of heat conducting metal forming a uniform pattern of resilient contacts at the interior of the envelope and adapted to engage the tube throughout the length and circumference thereof, a series of circumferentially spaced friction guides extending from an edge of the holder normally adjacent the envelope, and means at the base of the envelope comprising adjacent portions of the spring means and the envelope forming a resilient pocket adapted to receive the guides when the envelope is in place on the holder.

13. A vibration damping and heat dissipating clamp and shield for an electronic component comprising the combination of an encircling metal envelope exceeding in length and perimeter the length and perimeter of said component and adapted for attachment to a base, and an insert for said envelope comprising a member of resilient heat conducting metal extending throughout the interior of said envelope and adapted to be confined therein, said insert including a multiplicity of inwardly extending separate spring elements of substantially uniform size, said spring elements being spaced substantially uniformly in both longitudinal and circumferential directions and adapted to engage the component at a corresponding number of locations whereby to maintain said insert at a location spaced uniformly from said component, said insert having an outwardly springing engagement with the interior of said envelope.

14. A vibration damping and heat dissipating insert for clamping and shielding an electronic component and adapted for retention in a metal envelope, said insert comprising a member of resilient heat conductnig metal having a length and perimeter exceeding the length and perimeter of the component, said insert including a multiplicity of separate spring elements extending inwardly therefrom at uniform distances, said spring elements being spaced substantially uniformly in both longitudinal and circumferential directions and adapted to engage the component at a corresponding number of locations whereby to maintain said insert at a location spaced uniformly from said component.

15. A vibration damping and heat dissipating insert for clamping and shielding an electronic component and adapted for retention in a metal envelope comprising a member of resilient heat conducting sheet metal having a length and perimeter exceeding the length and perimeter of the component, said insert having a multiplicity of separate spring elements comprising cut-out portions of said member and bent inwardly therefrom and terminating at uniform distances from said member, said spring elements being productive of contact areas of substantial uniformity throughout both the length and perimeter of the component.

16. An electronic tube clamping and shielding insert for a tube shield envelope comprising a sheet of material in the form of a resilient cylinder substantially equivalent in circumference and length to the exterior of the tube, said cylinder having a multiplicity of spring contact elements of heat conducting metal extending inwardly of the inner face of the cylinder, said elements being spaced circumferentially and longitudinally at substantially equal intervals and each element including a tube contacting area having a length and breadth conforming to an area on the tube of corresponding length and breadth, said elements being adapted to surround the tube throughout the length and circumference thereof, said spring contact elements having faces all at substantially the same distance inwardly of the envelope whereby to provide a multiplicity of combined heat transfer and spring contact areas between the tube and the envelope throughout the length and circumference of the tube, said insert when confined in the envelope having portions thereof adapted to resiliently engage the tube in an inward radial direction and to engage the envelope in a radially outward direction whereby to provide spring pressure simultaneously against the tube and the surrounding envelope.

17. A vibration damping and heat dissipating insert for clamping and shielding an electronic component and adapted for retention in a metal envelope comprising a member of resilient heat conducting sheet metal, said insert including a multiplicity of spaced spring elements on said insert extending inwardly and throughout the length and perimeter of the insert, said spring elements having innermost portions of substantial length and breadth forming substantially arcuate areas adapted to engage corresponding arcuate areas on the exterior of the component and to establish a pattern of resilient engagement areas throughout the length and perimeter of the tube, and outwardly expandable areas on the exterior of said liner located intermediate said arcuate areas and forming a pattern of envelope engagement areas.

18. A vibration damping and heat dissipating clamp and shield for an electronic component comprising the combination of an encircling metal envelope adapted for attachment to a base, an insert for said envelope comprising a member of resilient heat conducting sheet metal, said insert including a multiplicity of spaced spring elements on said insert extending inwardly and throughout the length and perimeter of the insert, said spring elements having innermost portions of substantial length and breadth forming substantially arcuate areas adapted to engage corresponding arcuate areas on the exterior of the component and to establish a pattern of resilient engagement areas throughout the length and perimeter of the tube, and areas on the exterior of said liner intermediate said arcuate areas in resilient heat conducting engagement with the interior of said envelope.

19. A vibration damping and heating dissipating insert for clamping and shielding an electronic component and adapted for retention and mounting by means of a metal envelope comprising a member of resilient heat conducting metal, said insert including a multiplicity of spaced spring element contacts on said insert extending inwardly and throughout the length and perimeter of the insert, said spring elements having innermost portions of substantial length and breadth forming a substantially arcuate area pattern adapted to engage a corresponding arcuate area pattern on the exterior of the component and to establish a resilient engagement area pattern throughout the length and perimeter of the component, and means forming an opposite outwardly expandable spring contact area pattern on the exterior of said liner adapted to form an envelope engagement area pattern whereby to transfer heat from the component to the envelope and to dampen vibration between the component and the envelope.

References Cited in the file of this patent
UNITED STATES PATENTS

| | | |
|---|---|---|
| 1,426,861 | Haddock | Aug. 22, 1922 |
| 2,398,626 | Del Camp | Apr. 16, 1946 |
| 2,472,747 | Jones | June 7, 1949 |
| 2,512,424 | Goldstaub | June 20, 1950 |
| 2,646,460 | Del Camp | July 21, 1953 |
| 2,745,895 | Lideen | May 15, 1956 |

FOREIGN PATENTS

| | | |
|---|---|---|
| 350,471 | Great Britain | June 4, 1931 |
| 584,310 | Germany | Sept. 18, 1933 |

UNITED STATES PATENT OFFICE
CERTIFICATE OF CORRECTION

Patent No. 2,807,659                                              September 24, 1957

Leroy Ralph Woods

It is hereby certified that error appears in the printed specification of the above numbered patent requiring correction and that the said Letters Patent should read as corrected below.

Column 10, lines 5, 20 and 37, for "liner", in each occurrence, read -- insert --.

Signed and sealed this 21st day of January 1958.

(SEAL)
Attest:
KARL H. AXLINE

Attesting Officer

ROBERT C. WATSON
Commissioner of Patents